(12) United States Patent
Varrin, Jr. et al.

(10) Patent No.: US 9,767,927 B2
(45) Date of Patent: Sep. 19, 2017

(54) PARTICULATE REMOVAL SYSTEM

(71) Applicant: DOMINION ENGINEERING, INC., Reston, VA (US)

(72) Inventors: Robert D. Varrin, Jr., Reston, VA (US); David Arguelles, Herndon, VA (US); Michael J. Little, Ashburn, VA (US)

(73) Assignee: DOMINION ENGINEERING, INC., Reston, VA (US)

( * ) Notice: Subject to any disclaimer, the term of this patent is extended or adjusted under 35 U.S.C. 154(b) by 77 days.

(21) Appl. No.: 13/712,586

(22) Filed: Dec. 12, 2012

(65) Prior Publication Data

US 2013/0170601 A1     Jul. 4, 2013

Related U.S. Application Data

(60) Provisional application No. 61/569,631, filed on Dec. 12, 2011.

(51) Int. Cl.
| | |
|---|---|
| *G21C 19/40* | (2006.01) |
| *G21C 3/32* | (2006.01) |
| *B01D 46/10* | (2006.01) |
| *G21C 5/02* | (2006.01) |
| *G21C 19/307* | (2006.01) |

(52) U.S. Cl.
CPC ........... *G21C 3/3206* (2013.01); *B01D 46/10* (2013.01); *G21C 5/02* (2013.01); *G21C 19/307* (2013.01); *Y02E 30/40* (2013.01)

(58) Field of Classification Search
CPC .................................................. G21C 3/3213
USPC .......................................................... 376/313
See application file for complete search history.

(56) References Cited

U.S. PATENT DOCUMENTS

| | | | | |
|---|---|---|---|---|
| 4,096,032 A | * | 6/1978 | Mayers et al. ................. | 376/313 |
| 4,664,880 A | * | 5/1987 | Bryan ...................... | G21C 3/32 |
| | | | | 210/232 |
| 4,684,495 A | | 8/1987 | Wilson et al. | |

(Continued)

FOREIGN PATENT DOCUMENTS

| | | |
|---|---|---|
| JP | 56-117194 | 9/1981 |
| JP | 60-61089 | 4/1985 |

(Continued)

OTHER PUBLICATIONS

The Path to Zero Defects: EPRI Fuel Reliability Guidelines, Electric Power Research Institute, 2008, pp. 1-4.

(Continued)

*Primary Examiner* — Sean P Burke
(74) *Attorney, Agent, or Firm* — Pillsbury, Winthrop, Shaw, Pittman LLP

(57) ABSTRACT

A particulate removal apparatus and method are used to capture and remove particulates from nuclear reactor core coolant during normal operation. Bottom nozzle, particulate removal apparatus and top nozzle structures form an assembly sized to be installed in place of a nuclear fuel assembly. The particulate removal achieved reduces the inventory of corrosion product deposits, foreign objects and other particulates in the reactor coolant system. This in turn reduces activation or deposition of particulates on fuel cladding, with a corresponding improvement in fuel reliability and reduction in ex-core radiation fields.

12 Claims, 10 Drawing Sheets

(56) References Cited

U.S. PATENT DOCUMENTS

| | | | |
|---|---|---|---|
| 4,756,875 A * | 7/1988 | Tajima | B01D 63/024 210/500.23 |
| 4,820,426 A * | 4/1989 | Pfertzel | G21F 9/04 210/779 |
| 5,024,807 A | 6/1991 | Hatfield et al. | |
| 5,219,517 A | 6/1993 | Nylund | |
| 5,390,221 A | 2/1995 | Dix et al. | |
| 5,473,649 A | 12/1995 | Olsson et al. | |
| 5,479,461 A | 12/1995 | Kilian | |
| 5,490,189 A | 2/1996 | Schechter | |
| 5,524,031 A | 6/1996 | Kilian | |
| 5,867,551 A | 2/1999 | Toshihiko | |
| 6,847,695 B2 | 1/2005 | Kageyama et al. | |
| 6,901,128 B2 | 5/2005 | Mori et al. | |
| 7,889,829 B2 | 2/2011 | Lee et al. | |
| 8,705,685 B2 * | 4/2014 | Lelickens et al. | 376/313 |
| 2004/0071255 A1 | 4/2004 | Nylund | |
| 2004/0076253 A1 | 4/2004 | Soderlund et al. | |
| 2005/0031067 A1 | 2/2005 | Mori et al. | |
| 2006/0045231 A1 | 3/2006 | Lee et al. | |
| 2008/0013667 A1 | 1/2008 | Oh et al. | |
| 2008/0137795 A1 | 6/2008 | Hussey | |
| 2008/0296236 A1 | 12/2008 | Gross et al. | |
| 2009/0225924 A1 | 9/2009 | Lelickens et al. | |
| 2011/0268240 A1 | 11/2011 | Huq | |

FOREIGN PATENT DOCUMENTS

| | | |
|---|---|---|
| JP | 1-206294 | 8/1989 |
| JP | H08-075883 A | 3/1996 |
| JP | 2006-201107 | 8/2006 |
| JP | 2009-544932 | 12/2009 |
| WO | WO 2010/076315 | 7/2010 |

OTHER PUBLICATIONS

International Search Report and Written Opinion of the International Searching Authority issued for International Application No. PCT/US2012/069171, dated Aug. 6, 2013.

Extended Search Report as issued in European Patent Application No. 12869624.2, dated Jun. 10, 2015.

European Office Action dated Apr. 22, 2016 in corresponding European Patent Application No. 12869624.2 (5 pages).

Chinese Office Action dated Jun. 12, 2016 in corresponding Chinese Patent Application No. 201280068222.6 (21 pages).

Japanese Office Action mailed Sep. 27, 2016 in corresponding Japanese Patent Application No. 2014-546190 (8 pages).

* cited by examiner

PARTICULATE REMOVAL SYSTEM

CROSS-REFERENCE TO RELATED APPLICATION

This application claims priority and benefit under 35 U.S.C. §119(e) to U.S. Provisional Patent Application No. 61/569,631, entitled "In Situ Core Filter Module," filed on Dec. 12, 2011. The content of that application is incorporated herein in its entirety by reference.

BACKGROUND OF THE INVENTION

This invention relates to improving the safety, reliability and performance of nuclear reactors. More specifically, the invention relates to a method and apparatus for improving conditions in the primary system of light water reactors by removing impurities that may otherwise become activated in the reactor core and deposit on surfaces within the primary circuit, leading to component degradation and increased dose rates. The invention is applicable to pressurized water reactors (PWRs) and boiling water reactors (BWRs).

PWR nuclear power reactors use recirculating subcooled water in the reactor coolant system (RCS) to remove energy produced by fission in the core. The recirculating water flows upward under pressure through the core and then to the "primary side" of one or more steam generators, wherein the energy is transferred through the steam generator tubes to the secondary side of the steam generators where water is boiled to produce saturated or superheated steam. Most of the steam produced in the steam generator is directed to a turbine generator to produce electricity. Some steam is used to reheat steam in the secondary cycle, drive steam turbine driven pumps, or preheat feedwater that is fed to the steam generators. In some plants, steam may be used for other purpose such as seawater desalinization.

BWR nuclear power reactors use recirculating water to remove energy produced by fission in the core but unlike in PWRs, pool boiling occurs within the core of the reactor. To maintain favorable heat transfer and control of the fission process in BWRs, one or more recirculation loops are used to forcibly circulate liquid water upward through the core. Favorable conditions include: (1) enhanced convective and boiling heat flux at the higher velocities produced by recirculation, and (2) a higher liquid water fraction which increases moderation of neutrons. Steam generated in the core is separated from the recirculating steam-water mixture produced in the core and directed to a turbine generator to produce electricity, secondary cycle steam reheaters, steam turbine driven pumps, or to feedwater heaters to pre-heat recycled feedwater. The liquid phase water that exits the core with the steam is separated from the steam and is pumped back into the lower end of the core with the recirculation pumps. The recirculation pumps may be motor driven centrifugal pumps or a combination of jet pumps and centrifugal pumps.

Nuclear power reactors generate heat in their cores by fission of fissile materials such as U-235 or Pu-239. The cores may also contain fertile materials such as Th-233, which can be converted to fissionable species by irradiation in the core. The concentration of fissile material in PWR or BWR fuel is typically enriched over what is found in nature. The enrichment is typically to 2 to 20%, but it may be much higher. The balance of the fuel is typically naturally occurring non-fissile material (e.g., U-238). In light water reactors, the neutrons produced by the fission process are "moderated" by the water. Moderation lowers the energy of the neutrons and renders them more likely to promote desirable fission chain reactions with the fuel.

The chemical form of the fuel in most reactors is solid uranium oxide or a mixture of uranium oxide and plutonium oxide, but other forms that may be used include uranium or plutonium solid metal alloys. In general, the oxide fuel is formed into cylindrical pellets, which are stacked in fuel rods within "cladding" and further grouped in fuel rod assemblies. Most cladding is fabricated from zirconium alloys owing to the transparency of zirconium to neutrons, known as low neutron cross section, as well as the good corrosion resistance of zirconium alloys. A typical PWR may contain about 200 fuel assembles, each of which contains about 250 fuel rods (or pins) that are 3 to 5 meters in length. A typical BWR may contain 600 to 800 fuel assemblies, each of which typically contains 60 to 100 fuel rods (or pins) that are 3 to 4 meters in length. BWR fuel is also typically housed in removable "channels" which are elongated square tubes. The main purpose of the channel is to prevent cross flow of water and steam from assembly to assembly which further serves to ensure favorable thermal hydraulics, heat transfer and control of the fission process. In PWRs, cross flow of water from assembly to assembly is not avoided; therefore, fuel rods are not channeled but distributed in an open square or triangular pitch array.

DETAILED DESCRIPTION OF THE INVENTION

Figure 1:
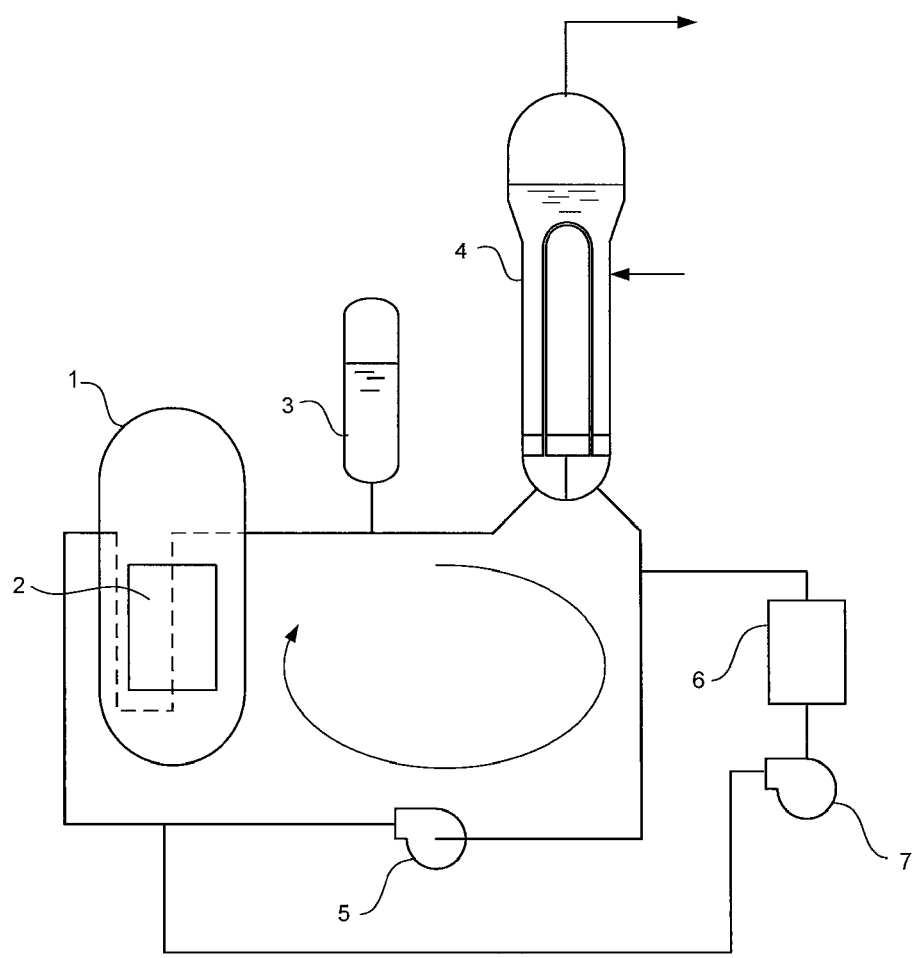
FIG. 1 is a schematic illustration of an embodiment of a PWR primary coolant loop.

In both PWR and BWR cores, about one-third of the fuel assemblies are replaced each refueling outage after a 12 to 24 month operating cycle. New fuel loaded into electric power generating PWR and BWR reactors may contain enrichment in fissile species up to 5% or so. The fuel that has been in the core for one cycle contains less fissile material, on the order of about one-half to one-third of the original fissile material. The fuel that has been used twice but is re-loaded in the core for a third cycle may contain even less fissile material, as little as 0.1 to 1% fissile material after two cycles of use. In fact, the initial fissile material in some of the oldest fuel may contribute less than 0.02% to the output of the plant (per assembly) as compared to an average of 0.5% (per assembly) for a core with 200 assemblies. In other words, these highly depleted assemblies may contribute as little as ½5th of energy of a new fuel assembly based on the initial fissile material enrichment. This low contribution is offset by the fission of fissile materials produced in the fuel during prior cycles of operation, such as Pu-239 and Pu-241 that can form from U-238 in PWR fuel.

Some older fuel, or so called "barrier assemblies," are placed at the periphery of the reactor core primarily as a neutron shield for the reactor vessel and internals to mitigate irradiation induced stress corrosion cracking of internals or embrittlement of the reactor vessel due to high neutron fluence (see for example NUREG 1.99 Revision 2). The twice burned fuel is often used as a shield owing to the significant mass of high density fuel materials, and hence a high affinity for absorbing radiation and neutrons. In some PWR core design strategies, on the order of 4 to 8 assemblies may be used as barriers at the periphery of the core. The reactor coolant flow through each of the fuel assemblies in a typical PWR core, including the barrier assemblies, is about 0.5% of the total flow. Four barrier assemblies in a PWR would receive in total about 2% of the RCS flow.

The weight of a typical PWR fuel assembly is about 1200 pounds (0.75 metric tonnes). The weight of a typical BWR assembly is about 550 pounds (0.5 metric tomes). During normal operation, the drag forces on fuel due to fluid flow are comparable to the weight of the fuel so there are no unacceptable upward drag loads on the upper core supports.

In a PWR, the RCS operates at about 2000 to 3000 psi (140 to 200 Bar) and 550 to 625° F. (285 to 330° C.) (subcooled conditions). In a typical BWR, the RCS operates at 1000 to 1100 psi (68 to 75 bar) and 550° F. (28.5° C.) (saturated conditions). The pressure drop through the core in a PWR is typically 25 to 75 psi (1.7 to 5 bar), which combined with other pressure losses in the reactor vessel, steam generators and RCS piping is overcome with reactor coolant pumps. The average pressure drop across the core of a BWR is on the order of 25 psi (1.70 Bar). In both PWR and BWR fuel designs, a series of open lattice support "grids" are also used to support the fuel rods that make up the fuel bundle, maintain separation between the rods and suppress vibration due to flow of the water or steam-water mixture along or across the rods. These grids may be fabricated from zirconium alloys or other metals. At the top and bottom of the fuel assemblies, upper and lower "nozzles" or tie plates structurally support the fuel, and engage with the lower and upper core support plates in the reactor vessel. The upper and lower nozzles are typically fabricated from stainless steel. The upper and lower core support plates in the reactor which support and engage the fuel are part of the overall reactor vessel internals arrangement.

PWR and BWR fuel assemblies may also contain other features including but not limited to: (1) burnable poison rods, (2) clearances or passages for axial insertion of control rods or control elements, (3) passages for insertions or installation of instruments that measure and monitor either thermal hydraulics or fission processes (e.g., neutron flux), (4) start up neutron sources, or (6) fluid passages that increase the local liquid water fraction and as such increase neutron moderation. In some locations throughout the core, including fuel positions at the periphery of the core where barrier assemblies are inserted, the fuel may not require provisions for accommodating any instrumentation, poisons, or neutron sources, as these are "non-instrumented" locations in the core.

Fuel species used in nuclear power reactors are hazardous to the public and environment if released. Also hazardous are fission "products" produced as a result of the nuclear fission reactions or decay processes. These include Cs-137, Sr-90 and Kr-85. Both cesium and strontium fission products are non-volatile and as such amenable to transport through soil and groundwater.

Nuclear fuel is also highly radioactive and as such is stored underwater until such time that fission products have decayed to the extent that it is practicable to handle or store it in air.

In addition to soluble fission products, other soluble and insoluble solid species that circulate in the primary coolant loop include: (1) activated and non-activated corrosion products, (2) metallic impurities (both soluble and particulate), and (3) foreign materials. By convention, "soluble" materials in the primary circuit of a nuclear plant are either truly soluble as ionic or non-ionic moieties, or are defined as those particulates that pass through a filter with a defined rating, for example 0.45 µm. In reality, particulate species may exhibit sizes below 0.45 µm, often with sizes as small as 0.1 µm. Smaller particles are often termed colloids, acknowledging that as particle size decreases, particles begin to manifest some properties of dissolved species. Larger insoluble particulates may exhibit sizes or effective diameter of up to 8 µm or more.

Corrosion products such as iron and nickel oxides are generated as surfaces of components wetted by the primary coolant oxidize and the oxides are released into the coolant. Soluble metal species such as ionic nickel, chromium, cobalt and iron are released from primary coolant pressure boundary surfaces which may be stainless steel or nickel alloys, or other components such as cobalt bearing valve seats. In the case of BWRs where the primary coolant system may include heat exchangers fabricated with copper-bearing alloys, the soluble species may also include copper.

Metallic fines and particulates particles, exhibiting sizes of order 0.1 µm to greater than 8 µm, are released from surfaces due to wear or erosion. Foreign materials include metals, dusts, debris and "foreign objects" that are left in the primary system after construction and assembly of the plant, or during refueling and maintenance outages when the primary system is open to the environment. Foreign objects can include metal shavings, tools, fasteners, loose parts and debris.

Concentration of corrosion products in circulation through the core and hence through the fuel assembles is typically on the order of 2 ppb. For a reactor coolant inventory of 200,000 to 750,000 pounds (100 to 350 tonnes), the mass of circulating corrosion products at any one time is quite small, on the order of a gram. Despite such a low inventory in circulation at any one time, each fuel assembly in a PWR core may accumulate several hundred grams of crud deposit or other corrosion product particulates over the course of an operating cycle. Analyses have shown that the crud and corrosion products that circulate through the core likely pass through the core many times before depositing or plating on the fuel surfaces. Similarly, deposition on ex-core surfaces occurs slowly over time. At a typical total PWR RCS flow rate of 70 to 150 million pounds per hour (32,000 to 68,000 tonnes per hour), the flow of corrosion products through an individual fuel assembly can be several grams per day or more, and several kilograms over an 18-month operating cycle. As such, while fuel assemblies are not efficient filters for crud, they will eventually capture crud due to various deposition mechanisms including those promoted by a small amount of boiling in the core and especially as the primary coolant is circulated many thousands of times through the core.

In addition to the crud on fuel, crud deposits form on essentially all primary loop pressure boundary surfaces (so called ex-core surfaces). The amount of crud on ex-core surfaces is estimated to be on the order of a one to tens of kilograms in a PWR, and much higher in a BWR due to the use of carbon steel in the RCS of a BWR, which has higher susceptibility to corrosion that the austenitic and nickel based alloys used in PWRs.

A specific problem with the foreign objects that circulate with the core is potential for physical damage to the fuel when even small debris becomes lodged near the cladding. Damage mechanisms include wear, fretting and impingement. Numerous methods and apparatus have been designed by fuel vendors to capture debris before it can enter the fuel itself. Examples include devices integral to fuel assemblies as described in numerous patents such as U.S. Pat. Nos. 4,664,880; 4,684,495; 5,024,807; 5,219,517; 5,390,221; 5,473,649; 5,479,461; 5,490,189; 5,524,031; 5,867,551; 6,847,695; 6,901,128; 7,889,829; and Patent Publications US2004/0071255; US2004/0076253; US2005/0031067; US2006/0045231; US2008/0013667and WO2010/076315. Debris filters, traps or screens are almost always located close to or as a part of the lower nozzle or tie plate in all fuel assemblies, and tend to have relatively large flow openings as compared to the size of corrosion products and crud or they would tend to undesirably restrict flow through the fuel assembly which has negative consequences in terms of reactivity control, heat removal and optimization of core thermal-hydraulic in normal and accident scenarios. In addition, the debris filters, traps and screens are specifically designed to avoid capture of crud as this could clog and starve of the fuel assembly of water, which would have a potentially serious safety impact as cooling of the fuel assemblies is a critical design requirement for the plant. Thus, the flow openings in debris filters which are integrated with the fuel assembly itself are typically greater than 1 mm in diameter (or equivalent hydraulic diameter).

Corrosion products, metallic fines, and foreign objects can all become activated or rendered radioactive due to neutron absorption as they pass through or near the core during plant operation. The corrosion products and fines have often been referred to as "crud" (Chalk River Unidentified Deposits, referring to the Chalk River nuclear plant site in Ontario, Canada). As these materials become activated and spread through the primary circuit, radiation dose fields increase, which in turn increase the radiation exposure or potential for contamination of workers. Crud is continuously generated by corrosion or erosion of the primary circuit. Subsequent activation of the deposits that rest on fuel surfaces may be released and re-deposit on ex-core surfaces.

Fuel removed after a period of operation typically is coated with a layer of crud. The thickness of this layer may vary from a few microns to more than 100 microns. In PWRs it tends to be thickest near the top of the fuel assembly, where in some BWRs it tends to be thicker near the bottom of the fuel.

Crud that deposits on fuel in PWRs can lead to a phenomenon known as Axial Offset Anomaly (AOA), also referred to as Crud Induced Power Shift (CIPS), wherein boron that is used for reactivity control accumulates in the pores of crud and affects the local power density of the core. Loose crud accumulations on fuel surfaces also can complicate movement of the fuel to dry storage and can complicated transport of the fuel to locations away from the nuclear plant due to the risk of spreading the highly radioactive crud to the environment.

Present methods for dealing with issue of crud include: (1) incorporating cleanup systems into the plant, (2) designing fuel that is tolerant to crud build up, and (3) developing primary water chemistry control programs that minimize crud generation and maximize release and capture of crud in exiting plant systems during plant shutdowns, which is a typical chemistry practice at PWRs. Such "crud burst" evolutions are expensive in that they delay shutdown of the plant for refueling.

Typically, a PWR incorporates a system in the primary side of the plant called the Chemical Volume Control System (CVCS) or "Letdown System." The primary purposes of the CVCS in PWRS are to: (1) adjust the concentration of neutron absorbing chemicals in the RCS, typically boric acid, (2) maintain RCS liquid inventory, (3) condition and clean reactor coolant required as seal water for RCP seals, (4) adjust RCS chemistry through addition or removal of species such as lithium, (5) control RCS activity during power operations by venting noble gases such as radioactive isotopes of xenon and krypton, (6) inert, fill, pressurize and degasify of the RCS, (7) control RCS hydrogen concentration, and (8) provide a means of adding species that mitigate corrosion of RCS components, such as zinc. The CVCS also includes in-line filters (sometimes as separate filters but also sometimes as ion exchange beds, which serve both a filtration and de-ionization function) to remove to the extent practicable the crud (corrosion products) from the RCS during startup, operation and shutdown of the plant. As discussed later, the CVCS operates continuously but is only partially effective as a filtration system.

Reactor coolant typically flows to the CVCS from a RCS "cold leg" letdown line on the suction side of a reactor coolant pump (RCP). In the CVCS, the letdown flow is depressurized, cooled, cleaned, filtered, degassed, equilibrated with desired gases, re-pressurized and reheated before it is returned the RCS or stored.

The normal letdown flow rate is on the order of 16,000 to 32,000 pounds per hour (7 to 14 tonnes per hour) corresponding to a volumetric flow of 40 to 80 gallons per minute (13 to 18 cubic meters per hour) at RCS temperature and pressure. As discussed earlier, the normal RCS flow is on the order of 70 to 150 million pounds per hour (32,000 to 68,000 tonnes per hour) on a mass flow basis. Thus, the CVCS let down flow is on the order of 0.01 to 0.02% of the RCS flow. With an RCS liquid inventory of about 600,000 pounds (300 tonnes) of coolant, one complete turnover of the RCS through the CVCS takes on the order of 30 hours (1800 minutes). On the other hand, the residence time for recirculating coolant in the RCS is less than 1 minute. Therefore, a volume of primary coolant containing corrosion products passes through the core many times before it passes through the CVCS.

The exact letdown flow is plant specific and may depend on a number of factors including overall RCS design, number of RCS loops, chemistry control strategy and various plant specific goals for chemistry and RCS activity control. This may include concerns regarding RCS and fuel cladding integrity, as some corrosion mechanisms affecting the RCS and fuel depend on the RCS coolant chemistry such as pH limits, lithium and hydrogen concentration, and zinc concentration. Zinc is often added to the RCS for mitigation of stress corrosion cracking of certain susceptible RCS components, or to lower plant dose rates by reducing the incorporation of Co-58 and Co-60 species into ex-core surfaces (i.e., surfaces of components to which workers may exposed during periods of refueling or maintenance).

There are typically several paths by which the letdown flow can be either returned to the RCS or stored. These include re-injection directly into to the RCS or through the RCP seals. The majority of the letdown flow to the CVCS is typically returned to the RCS through a cold leg of a different loop via a charging line connected to the discharge side of an RCP.

In the CVCS system, reactor coolant passes through reactor coolant filters and demineralizers. These filters and demineralizers are designed to: (1) remove as much of the insoluble crud and soluble ionic and corrosion product species (e.g., oxides and spinels of Cr, Fe, Ni, Co) as possible, (2) remove excess Li produced by neutron absorption of B-10, (3) remove non-volatile radioactive fission products such as cesium (e.g., Cs-137) from the RCS, and (4) control boron concentration for reactivity control.

The CVCS system incorporates features and components that are designed to permit overall control of the RCS liquid inventory as well.

Generally, the CVCS filters are designed to collect fines and particulates of 5 micron or greater. Finer filter media can also be used to collect fines and particulates as small as 0.1 micron. However, this can complicate operation of the CVCS system and require more frequent filter change-outs. In various embodiments, the particle removal apparatus may be adapted for removal of particles in the range of about 0.5 to 10 microns, about 1-8 microns, about 1-5 microns, about 50 microns and smaller, or about 100 microns or smaller. As will be appreciated, such apparatus will tend to remove particles of the rated size or larger. Additionally, devices rated for removal of larger particles will tend to capture some fraction of smaller particles as well. Thus, a device rated at 50 microns will also capture some 10 micron particles, for example. Furthermore, as particles accumulate, the accumulation will tend to act to reduce the size of particles that are able to pass through.

In addition, plants that add zinc to the RCS sometimes experience higher particulates in the RCS and actually tend to use coarser filter media to avoid excessive number of filter replacements. Increasing flow through the CVCS to improve filtration above 0.01 to 0.02% of the RCS flow could in principal be achieved, but this decreases the efficiency of the plant. The letdown flow is cooled in non-regenerative heat exchangers, and only partially re-heated by regenerative heat exchanger; thus, some of the energy in the coolant that passes through the CVCS is lost to the environment as opposed to being available to generate electricity. Furthermore, increasing flow through the CVCS may require larger pumps to re-pressurize the letdown flow before it is returned to the RCS, and may complicate the other functions of the overall CVCS system such as reactivity control, chemistry control, and RCS volume control.

Evidence of the inability of the CVCS to serve as an effective filtration system is widespread. Among the evidence is the following: (1) PWR and BWR fuel becomes fouled with crud over an operating cycle, (2) ex-core radiation doses are primarily caused by crud circulating through and depositing on ex-core surfaces rather than being collected in the CVCS, (3) estimates of RCS crud inventories are far less than the amount of material collected on RCS filters, and (4) shutdown of the plant can intentionally or unintentionally lead to "crud bursts" in the RCS.

In BWRs, cleanup of the primary coolant is primarily with the Reactor Water Cleanup System (RWCU). The RWCU receives about 300 to 400 gallons per minute (66 to 90 cubic meters per hour) or 1% of the RCS flow from the recirculating primary coolant via letdown flows from the bottom of the reactor vessel or the recirculation system. The RWCU system cools the letdown flow and uses filters and demineralizers to reduce the inventory of crud in the RCS. Despite higher flow rates as compared to PWR CVCS systems, the amount of residual deposited crud in a BWR RCS is typically orders of magnitude higher than that in a PWR. Most of this crud deposits in the core due to the much higher boiling duty of a BWR (although a small amount of boiling also typically occurs in PWR cores near the upper end of the fuel).

To prevent release of the fuel and fission products from within the fuel rods, designers of nuclear power reactors pay particularly close attention to the design, fabrication and quality of the nuclear fuel rod cladding to make it as robust as possible. Despite these efforts, fuel cladding integrity issues exist. The severity of fuel integrity issues is well documented in "The Path to Zero Defects: EPRI Fuel Reliability Guidelines" (2008). As discussed in this reference, fuel reliability is critical to the safe and economical operation of nuclear power plants and the cost of fuel failures due to even minor breaches in the cladding of a limited number of fuel rods can cost a utility as much as $40 to $80 million dollars.

Furthermore, owners and operators of nuclear plants expend great effort to "design the core" so as to place once, twice and thrice burned fuel in a pattern that optimizes energy production, but minimizes the potential for crud deposition and hence cladding corrosion or crud deposition.

The designers and operators of nuclear power plants strive to maintain primary coolant chemistry and minimize impurities through primary chemistry control programs. Objectives of primary water control include: (1) maintaining chemistry and pH, (2) controlling concentration of crud, (3) reactivity control under normal and accident conditions. During shutdown, the chemistry of the RCS coolant can be adjusted to promote the release of soluble and insoluble species from in core (i.e. fuel surfaces) or ex-core (i.e. RCS) surfaces. This is typically done by sequentially producing chemically reducing followed by chemically oxidizing conditions as the RCS is cooled. During such crud bursts, it has been estimated that from about 100 to several thousand grams of crud is dislodged from ex-core surfaces and collected in the CVCS over a period of about 24 hours as the plant cools down. This compares to the 10's of thousands of grams (or 10's of kilograms) of crud that are resident in the RCS prior to shutdown of the plant. In this regard, the particle removal apparatus in accordance with embodiments may be adapted to remove 100 or hundreds of grains, or may be adapted to remove 1000 or 10000 grams, or ranges within those endpoints.

Owners and operators of nuclear plants are faced with two critical tasks that relate to presence of corrosion products, impurities, fission and fuel fragments, and foreign materials in the primary coolant system. The first is to minimize the potential for fuel failures; the second is to manage radiation fields. Removal of these species is also desirable as it can reduce the radiation emitted from the primary coolant system during periods of plant maintenance.

The economic significance of maximizing fuel reliability, reducing radiation doses, and optimizing the safe and economic operation of the plants is high. Specifically, the cost of extending a refueling outage by even one day to accommodate a "crud burst" may exceed $1 million. A forced outage due to failed fuel can exceed $10 million. The cost of reducing power because of crud induced AOA can exceed tens of millions of dollars.

The economics of significance of reducing worker radiation dose is also significant. For example, a reduction in worker dose in an outage by 1 man-rem is assigned a "value" of $10,000 to $30,000. If a typical outage dose is 100 man-rem, a 25% reduction in worker radiation exposure is equivalent to $250,000 to $750,000.

One aspect of an embodiment of the invention is to reduce the inventory of crud circulating in the RCS of a nuclear plant and thereby the deposition of crud on fuel and on ex-core surfaces.

Another aspect of an embodiment of the invention is to collect the crud such that it can be removed from the RCS during refueling outages.

Another aspect of an embodiment of the invention is to achieve reduced inventories of circulating crud with moderated impact on the electrical output of the plant while avoiding or reducing embrittlement of the reactor pressure vessel or other potential risks to plant integrity.

Embodiments of the present invention relate to methods and apparatuses for capturing particulates and crud from the RCS fluid in a nuclear power plant. One or more particulate removal apparatuses are positioned in the core of an electric power producing PWR or BWR plant. The plant is operated with the apparatus in place. The particulate removal apparatus may replace one or more fuel assemblies, or be a modified fuel assembly with integral filtration or other means of particulate capture (e.g., a hydrocyclone or combination of filtration and hydrocyclones). In this regard, the apparatus is dimensioned substantially similarly to a fuel assembly and includes connectors that are similar to those in a typical fuel assembly to allow it to be placed in a fuel assembly position without modification to the core. As will be appreciated, substantially similarly in this context means that the dimensions and connectors are sufficiently identical to those of a fuel assembly so that the apparatus may be positioned appropriately.

The particulate removal apparatus can be placed at any core location. In an embodiment, the particulate removal apparatus is placed at the periphery of the core. In a further embodiment, the apparatus may be placed in a location normally reserved for a barrier fuel assembly. By placing the apparatus in a location normally used for a two-times or thee-times burned barrier assembly, there can be a reduction in possible loss of power generation during the operating cycle, since the fuel normally loaded in these locations would have contributed less to plant output than the average fuel assembly. In another embodiment, one or more pairs of particulate removal apparatuses are placed in symmetrical locations in the core to promote the overall neutronic and thermal hydraulic symmetry of the core. In another embodiment, the overall "core design" and the remainder of the fuel assemblies are designed to compensate for any reduction in local power generation at the location(s) of the apparatus, for instance by small increases in the enrichment of other fuel assembles.

The overall thermal hydraulics of the core and loads on core support structures are maintained when employing the apparatus since it is designed so that the reactor coolant fluid flow through the apparatus is similar to that of a normal fuel assembly. The apparatus is also designed so that pressure drop of the coolant as it passes through the apparatus is similar to that of a normal fuel assembly. More specifically the flow through the apparatus is similar to that of a normal fuel assembly or about 0.5% of the core flow, and the cross-sectional area and form drag and friction loses in apparatus are similar to those in a fuel assembly. While specific embodiments of the invention may involve using more than one apparatus, use of just one apparatus is possible, as the flow through one apparatus is about 25 to 50 times higher than the flow through the CVCS in a PWR. Further, the use of multiple apparatuses would further enhance the proportion of filtered flow (i.e., the flow rate through two filter apparatuses would be 50 to 100 times higher than through the CVCS in a PWR and so on). Hence, the potential of the apparatus serving as a means of filtration for a given time period is greatly enhanced over the CVCS at equivalent filtration efficiencies.

FIG. 1 illustrates a typical PWR primary coolant loop showing a reactor vessel 1 and core 2, pressurizer 3, steam generator 4, reactor coolant pump 5, CVCS 6, and charging pump 7.

Equation 1 describes a simple model of the filtration efficiency of the invention:

$$A = ST \frac{(N - N_c)\eta_a}{(N - N_c)\eta_a + N_c\eta_c + \frac{F_l}{F_t}N} \quad [1]$$

where
A=core crud accumulation on fuel assemblies (kg/cycle)
S=crud generation rate (kg/s)
T=cycle length (s/cycle)
N=number of locations for fuel assemblies in the core (the total of those occupied by fuel assemblies and those occupied by filtration apparatuses)
$N_c$=number of filtration apparatuses in the core
$\eta_a$=fuel assembly crud removal efficiency
$\eta_c$=filtration apparatus crud removal efficiency
$F_l$=the flowrate of coolant to the CVCS or RWCU letdown (kg/s)
$F_t$=the flowrate of coolant through the core (kg/s)

Figure 10:
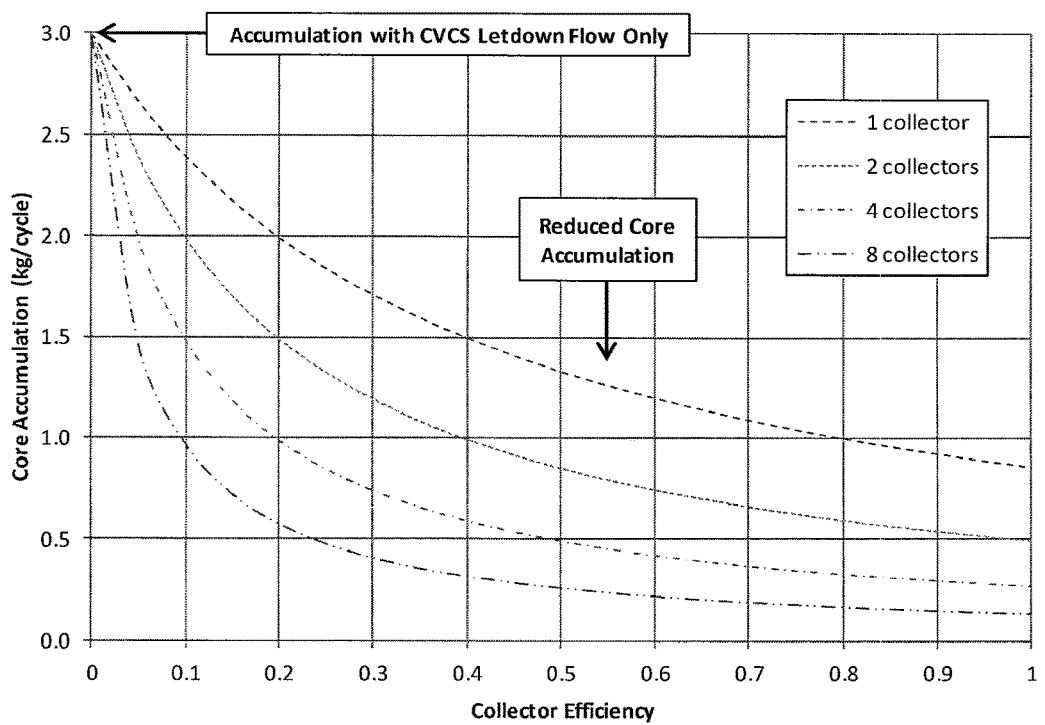
FIG. 10 is a graph illustrating theoretical accumulation of particulates in the core (crud) over a typical operating cycle of 12 to 18 months vs. efficiency of particulate removal in accordance with an embodiment of the invention.

FIG. 10 shows an example of the potential for particulate crud/corrosion product capture even with an assumption that removal by the letdown system is 100% efficient. Even at a conservative efficiency of 80%, the ability to reduce core crud inventories by a factor of three or more is predicted. With four apparatuses, the reduction may be about 90%, or from 3 kg without the apparatuses to about 0.3 kg with the apparatuses.

In an embodiment, the apparatus included filter media that may be finer than that used in a typical CVCS (on the order of 5 micron). For example, on the order of 100 ft² of 0.1 to 0.5 micron rated porous metal filter media will allow for a flow equivalent to that which flows through a normal fuel assembly and will result in a pressure drop on the order of 10 to 20 psi, with the later pressure drop occurring after retention of several kilograms of particulate material (an inventory that is similar to that which exists in PWR RCS system). This pressure drop range is similar to or lower than that seen through each fuel assembly in the core, and features are incorporated into the filtration apparatus to match the pressure drop even more closely to that of a normal fuel assembly. More specifically, additional flow restrictions such as orifices may be incorporated into the apparatus to tailor the pressure drop to be even closer to that of a normal fuel assembly. As will be appreciated by those skilled in the art, filter media with larger openings may also be incorporated into a particulate removal apparatus of the current invention, for example, to remove particles up to 10 micron in diameter or agglomerations of particles to 100 micron in effective diameter. These agglomerations may be comprised of exfoliated crud particles, for example.

In an embodiment, the particle collection apparatus includes a passive flow-restricting component that reduces flow through the particle collection apparatus in response to changes in water temperature, flow rate, pressure, density, viscosity, or other local condition that varies as a function of plant status. Such flow-restricting components include, but are not limited to, bimetallic disc valves, spring-loaded relief valves, check valves, foot valves, labyrinth seals, and orifices. Such flow-restricting components generally tend to improve the retention of captured particles times when particle removal is not required, such as during plant shutdown and forced oxidation (crud burst) evolutions.

Other features can optionally be incorporated in various embodiments of the invention including debris filters or isolation valves to prevent the escape of foreign material from the apparatus. As discussed above, debris filters which are typically integrated into the design of nuclear fuel assemblies must have a minimum opening diameter to ensure adequate cooling flow to the fuel assembly. In contrast, debris filters incorporated into a particulate removal apparatus of the type disclosed herein may be comprised of wide range of opening sizes because the particulate removal apparatus is separate from the fuel assembly. For example, debris filters incorporated as part of the current invention may have openings that are up to 0.1 mm in effective diameter, which would be expected to trap small metallic fines and other small foreign objects that would pass through the requisite openings in standard fuel assembly debris filters. Debris filters incorporated as part of the current invention may also have openings that are 1 mm or greater in effective diameter in order to capture larger particles and debris.

In an embodiment, corrosion resistant and radiation tolerant materials may be used for the construction of the apparatus including any filtration media in the apparatus. One example is a porous metal filter medium. Low cobalt metallic filter media may be used to reduce potential contribution of radioactive species to the RCS from the filter itself.

In an embodiment, passive metal mass is included as part of the apparatus to not only replicate the weight of a fuel assembly (owing to the particulate capturing component of apparatus such as the filter media likely being less weight that fuel rods), but also provide shielding capability much like a barrier fuel assembly. This mass of metal may be in the form of plates or a plurality of solid rods.

In an embodiment, upper and lower nozzle designs are replicated so that handling and storing of the apparatus with existing plant equipment such as refueling machines and spent fuel pool racks.

In an embodiment, a bypass flow path is included to ensure coolant water still flows through the apparatus even in the event that the filter clogs with crud.

In an embodiment, the particulate capturing components of the apparatus are incorporated in a portion of a fuel assembly containing a plurality of normal fuel rods, but a reduced number as compared to a typical assembly. In this embodiment, the hybrid fuel assembly/filtration apparatus serves both as a filter and as a source of nuclear energy.

In an embodiment, the particulate removal apparatus may be removed from the nuclear reactor and the particulate removal capacity may be regenerated. This removal may occur, for example, during a normal maintenance outage and regeneration may be achieved, for example, by backwashing the particulate removal apparatus or by using ultrasonic cleaning techniques.

In an embodiment, the particulate removal apparatus may be handled, stored and disposed of in the same manner as a nuclear fuel assembly when its particulate removal capacity is exhausted. For example, the exhausted particulate removal apparatus may be transferred to and stored in the spent fuel rack.

FIG. 1 illustrates an embodiment of a typical PWR primary coolant loop showing a reactor vessel 1 and core 2, pressurizer 3, steam generator 4, reactor coolant pump 5, CVCS 6, and charging pump 7.

Figure 2:
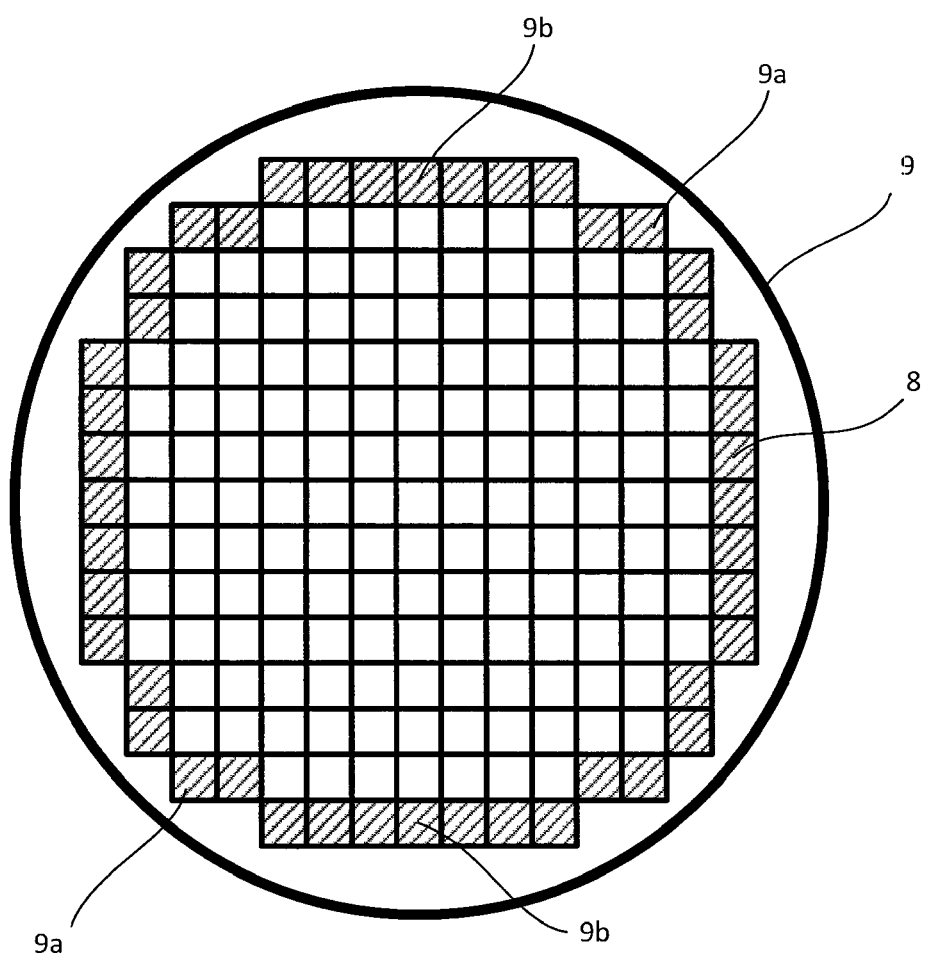
FIG. 2 is a plan view of an embodiment of a reactor vessel core, including fuel assemblies within a circular envelope

FIG. 2 is a plan view of an embodiment of a reactor vessel core, comprised of a grid of fuel assemblies within a circular envelope. One or more fuel assemblies near the outer edges of the core 8, referred to as barrier assemblies, may be installed in the indicated locations to provide shielding to the reactor vessel 9 from radiation from higher power assemblies closer to the center of the core. In another embodiment, pairs of particulate removal apparatuses are installed in symmetric location of the core such as 9a or 9b. One, two or more pairs of apparatuses may be utilized.

The exact location each of the individual apparatuses constituting a pair may depend on the exact core design which would take into account local neutronics, overall core neutronics, the location of core instruments and control rods, as well as the physical symmetry of the locations. As will be appreciated by those skilled in the art, multiple particulate removal apparatuses may be used in symmetric or non-symmetric configurations. The exact number of apparatuses to be used and installation locations would be dependent on the exact core design.

A more particular embodiment is shown in FIGS. 3 to 9, including a particulate removal apparatus with outside profile similar to that of a fuel assembly.

Figure 3:
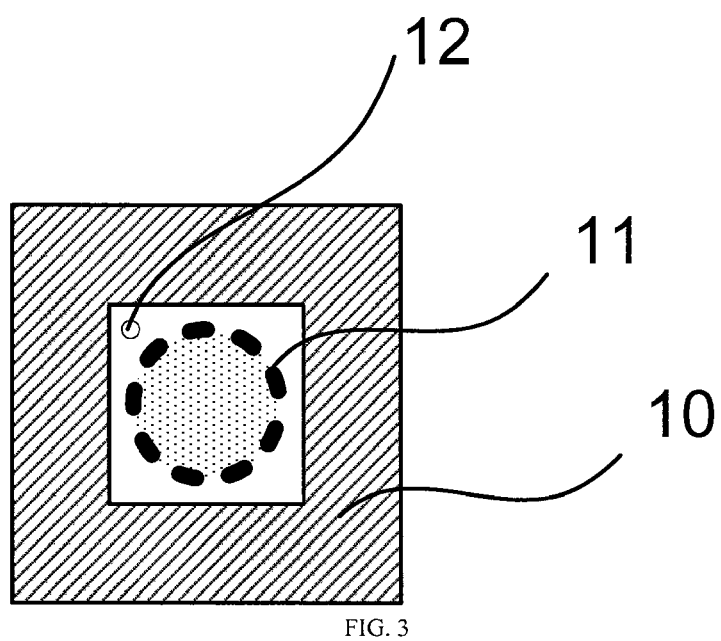
FIG. 3 is a plan view schematic of an embodiment of a particulate removal apparatus.

FIG. 3 is a plan view schematic of an embodiment of a particulate removal apparatus, including a housing 10, particulate removal zone 11, and bypass hole 12.

Figure 4:
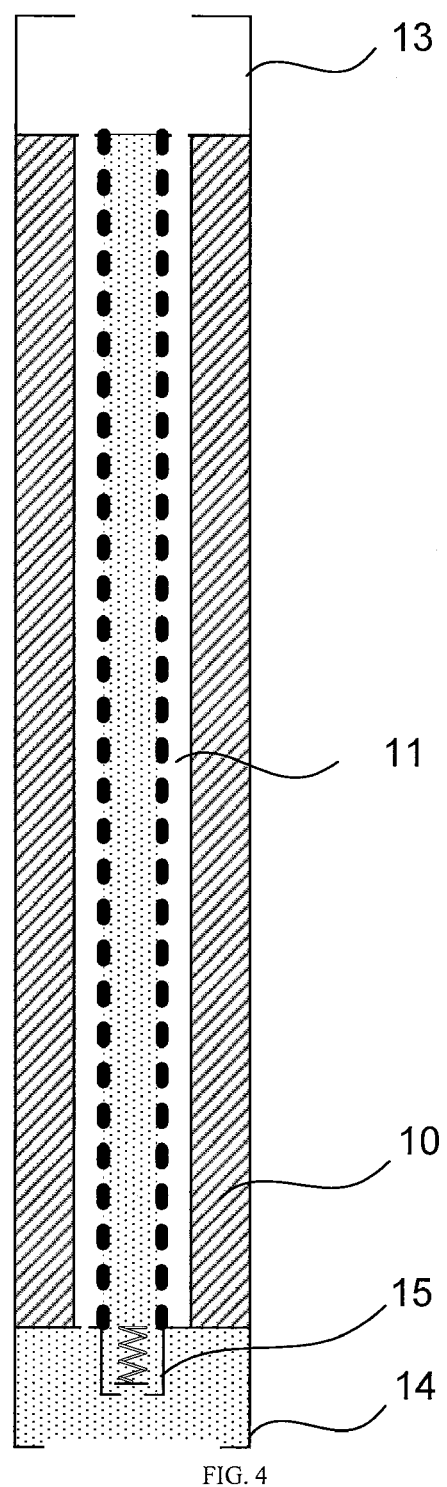
FIG. 4 is an elevation view of an embodiment of a particulate removal apparatus with a single zone of filtration.

FIG. 4 is an elevation view of an embodiment of a particulate removal apparatus with a single zone of particulate removal. An upper nozzle 13 is connected to a lower nozzle 14 by a housing 10. A foot valve 15 is located at the entrance to the particulate removal 11.

Figure 5:
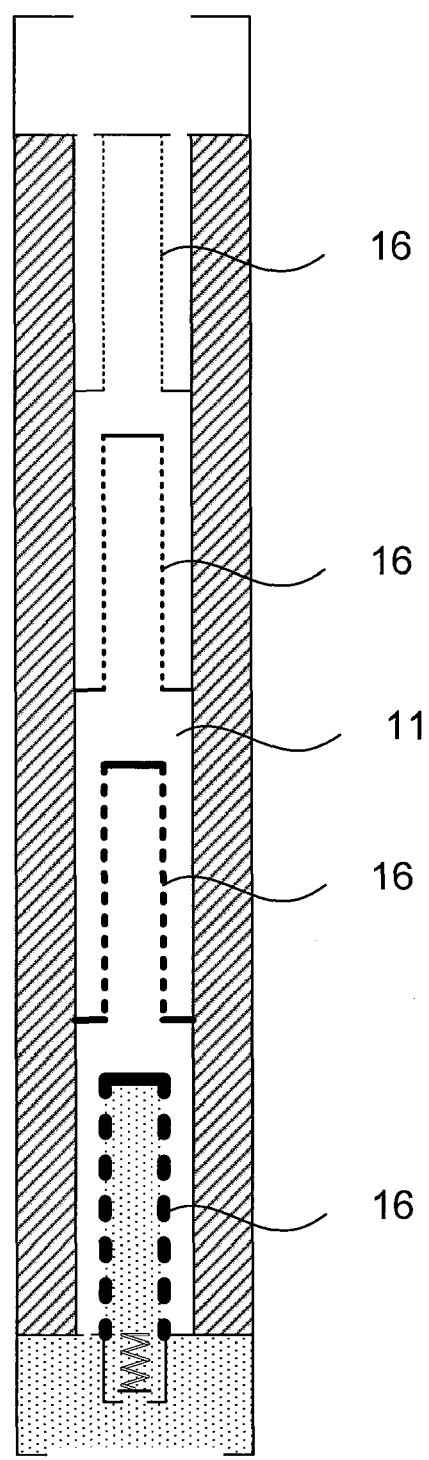
FIG. 5 is an elevation view of an embodiment of a particulate removal apparatus with multiple zones of separation within filtering region

FIG. 5 is an elevation view of an embodiment of a particulate removal apparatus with multiple individual zones of particulate removal 16 within the overall particulate removal zone 11.

Figure 6:
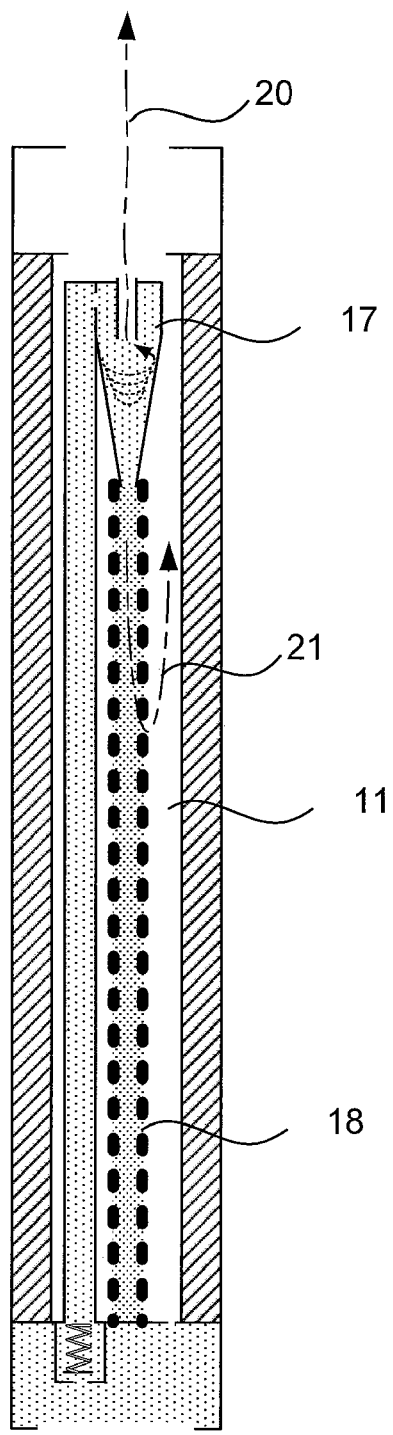
FIG. 6 is an elevation view of an embodiment of a particulate removal apparatus with multiple zones of separation within the filtering region.

FIG. 6 is an elevation view of an embodiment of a particulate removal apparatus a multiple zones of particulate removal within the particulate removal region 11 of different types, including a cyclonic separation stage 17 and a conventional filtration separation stage 18.

Figure 7:
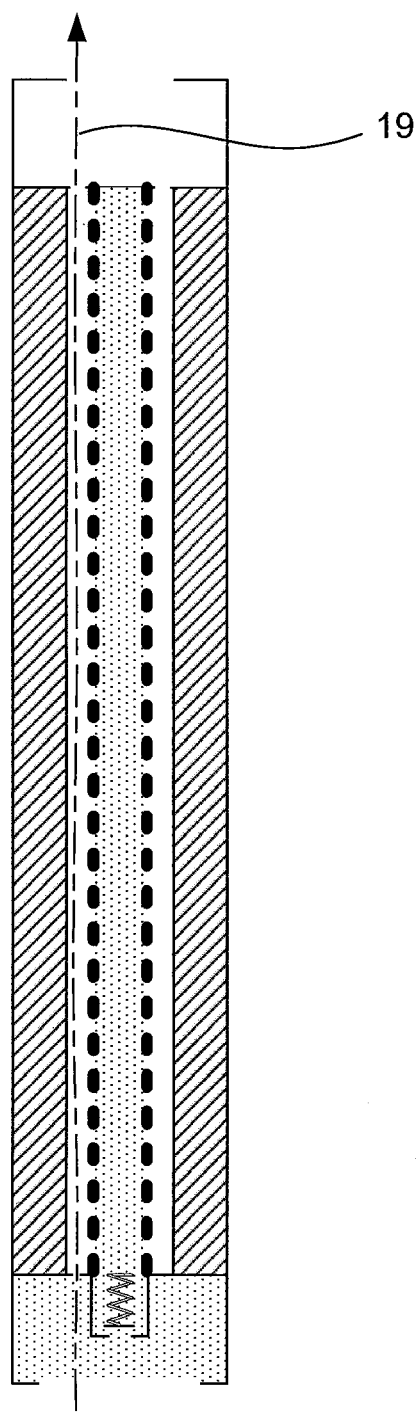
FIG. 7 is an elevation view of an embodiment of a particulate removal apparatus illustrating the bypass flow path through the apparatus.

FIG. 7 is an elevation view of an embodiment of a particulate removal apparatus the bypass flow path 19 through the module.

Figure 8:
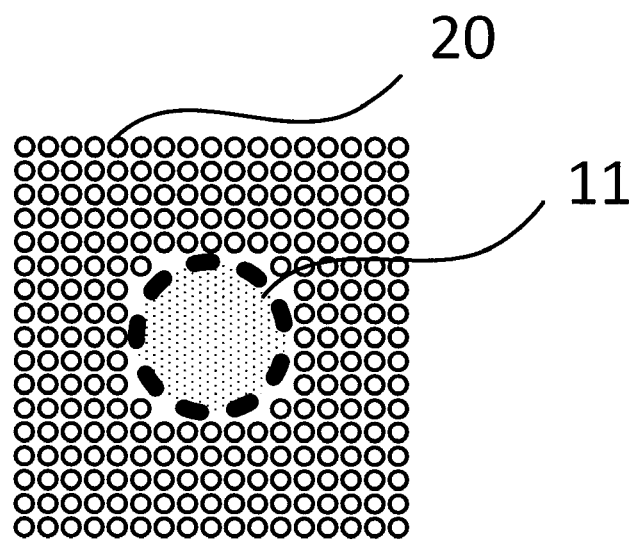
FIG. 8 is a plan view schematic of an embodiment of a particulate removal which includes a number of fuel rods in addition to the filtration region.

FIG. 8 is a plan view of an embodiment of a hybrid particulate removal apparatus includes a particulate removal zone 11 within an array of nuclear fuel rods 22.

Figure 9:
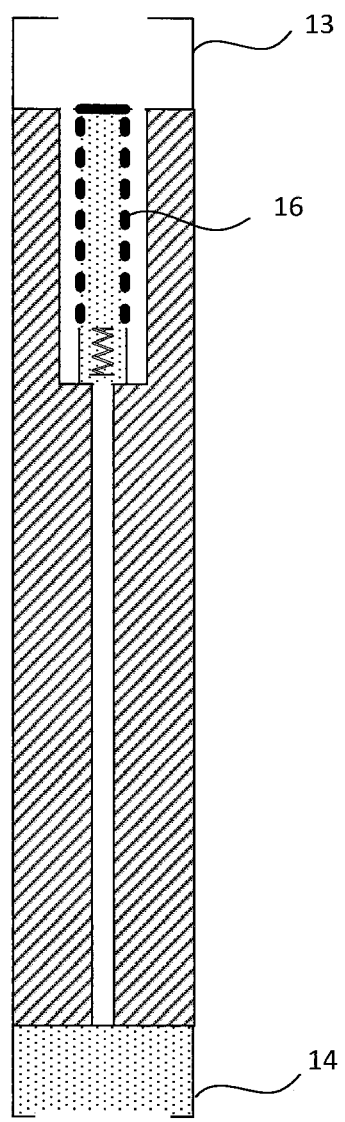
FIG. 9 is an elevation view of an embodiment of a particulate removal apparatus in which filtration elements comprise only a portion of the overall length of the apparatus.

FIG. 9 is an elevation view of an embodiment of a particulate removal apparatus with one or more particulate removal features 16 extending over a partial length of the apparatus integral to the upper nozzle 13 or lower nozzle 14.

Flow enters the assembly through a lower nozzle 14, and is divided into a particulate removal flow and bypass flow 19. The particulate removal flow is directed through an optional foot valve 15, through a particulate removal region 11, and then out of the assembly through an upper nozzle 13.

The foot valve 15 is designed such that it is fully open during power operation (high core flow, high temperature), but closed during shutdown crud burst evolutions (low core flow, reduced temperature), such that the dissolution of captured crud during crud burst evolutions is minimized. In addition, the foot valve prevents captured crud from falling out of the assembly during handling or storage.

The bypass flow 19 is directed from the lower nozzle region through an orifice 12 bypassing the foot valve 15 and filtering region 11, and joins the particulate removal flow through the assembly and out through an upper nozzle 13.

Portions of the assembly integral to or adjacent to the housing 10 between the lower and upper nozzles 13 and 14 are comprised of thick members that function as the structure of the assembly, provide neutron shielding for the vessel similar to a barrier assembly, and contribute mass so that the assembly mass is similar to that of a fuel assembly.

The particulate removal region 11 may be comprised of one or more zones of filtration, incorporating one or more different filtration or separation processes. In one embodiment, the filtering region 11 is comprised of one or more filter elements made from sintered metal fiber, sintered metal powder, wedge wire, wire mesh, or other radiation tolerant media.

Another embodiment is shown in FIG. 6, in which the particulate removal region 11 includes both cyclonic separators 17 and filter elements 18. In this embodiment, flow through the cyclone separators is divided into a high particulate concentration "underflow" 21 and a low particulate concentration "overflow" 20. The underflow 21 is directed through the filter elements 18 and then exits the assembly through the upper nozzle 13. Some or all of the overflow 20 bypasses the filter elements and is discharged out of the upper nozzle 13.

The invention is designed to be handled and disposed of in the same manner as spent nuclear fuel. The geometry of the upper 13 and lower nozzle 14 is designed to mimic that of a fuel assembly for handling purposes, and to interface with the appropriate reactor vessel components.

In the embodiment illustrated in FIG. 7, the bypass flow path 19 is designed to control pressure drop across the assembly, provide cooling flow in the event of complete filter media plugging, and to provide a flow path for draining of water from the assembly for disposal.

The invention may also be adopted for use in pressurized heavy water reactors (PHWRs) or Eastern European PWR designs such as VVER plants.

In an embodiment, the particulate removal apparatus is handled, stored and disposed of in a similar manner to a fuel assembly. In this regard, after use, the particulate removal apparatus may be placed in a spent fuel rack after its particulate removal capacity is exhausted.

In embodiments, the particulate removal capacity is regenerated. Regeneration may be performed, for example, by backwashing the particulate removal apparatus or by ultrasonic cleaning, though other approaches are available. It may be useful to perform regeneration during a normal maintenance outage, so that the regeneration function does not reduce plant availability.

In embodiments, the particulate removal apparatus may incorporate a plurality of particulate removal zones within a particulate removal region. The plurality of zones may be arrayed in series or in parallel.

In an embodiment, a passive flow limiting device is used to restrict flow past the collected particles during specific plant operating conditions to improve the retention of captured particles.

As will be appreciated from the foregoing, core designers can optimize the enrichment and loading of other fuel assemblies so as to compensate for the loss of energy production resulting from the removal of one or more fuel assemblies from the core and replacing them with the described particulate removal apparatus. As discussed earlier, placing the apparatus at the location of a barrier assembly would tend to result in reduced penalty with respect to energy production, as those assemblies are essentially depleted. Placement of pairs of apparatuses in symmetrical locations in the core may simplify core design and result in symmetric thermal hydraulics and neutronics.

Those skilled in the art will appreciate that the disclosed embodiments described herein are by way of example only, and that numerous variations will exist. Where not otherwise understood by those of ordinary skill in the art, the terms "substantially" or "about" should be understood to encompass differences of approximately 10%. The invention is limited only by the claims, which encompass the embodiments described herein as well as variants apparent to those skilled in the art. In addition, it should be appreciated that structural features or method steps shown or described in any one embodiment herein can be used in other embodiments as well.

The invention claimed is:

1. A method for removing corrosion product particulates from recirculating primary coolant in a nuclear plant comprising:
   operating the nuclear plant to generate power;
   collecting and capturing corrosion product particulates generated by corrosion of primary circuit wetted surfaces, by filtering the recirculating primary coolant with a particulate removal apparatus located in a core of the nuclear plant while operating the nuclear plant to generate power, the particulate removal apparatus including a porous metallic filter medium adapted to filter and capture the corrosion product particulates in the core of the nuclear plant while coolant fluid recirculates in the core of the nuclear plant to improve fuel integrity and performance by preventing the corrosion products from depositing on fuel cladding surfaces and to mitigate radiation fields within the nuclear plant by preventing the release and redistribution of activated corrosion products, the particulate removal apparatus being installed in the core in place of at least a part of a standard fuel assembly; and
   restricting flow through the particulate removal apparatus in response to a change in a coolant chemistry to retain captured particulates;
   wherein the particulate removal apparatus is removed from the core after one operating cycle.

2. The method of claim 1 wherein the particulate removal apparatus is installed in a barrier fuel location.

3. The method of claim 1 wherein the particulate removal apparatus is installed in a center of the core.

4. The method of claim 1 wherein pairs of particulate removal apparatuses are installed in symmetric locations.

5. The method of claim 1 wherein the core design is adjusted to compensate for the lost energy production from the fuel that would have been installed at the location used for the particulate removal apparatus.

6. The method of claim 1 wherein the nuclear plant is selected from the group consisting of a PWR, BWR, a CANDU or a VVER.

7. The method of claim 1 wherein the filter medium comprises a radiation tolerant filtration medium adapted to be tolerant to radiation present in the core of the nuclear reactor.

8. The method of claim 1 wherein the particulate removal apparatus further comprises a cyclone separator, the cyclone separator being adapted to produce a first flow having a lower particulate concentration and a second flow having a higher particulate concentration, the method further comprising directing the first flow through a bypass path and directing the second flow through the filter medium.

9. The method of claim 1 wherein particulate removal capacity of the particulate removal apparatus is regenerated.

10. The method of claim 1, wherein the particulate removal apparatus includes a bypass path, configured to allow fluid flow to bypass the filter medium, and wherein the method further comprises opening flow through the bypass path to reduce dissolution of captured crud during a crud burst event.

11. The method of claim 1, wherein the filter medium is configured and arranged to filter particulates having a diameter between 0.1 µm and 8 µm.

12. The method of claim 1, wherein the particulate removal apparatus comprises a filtration medium with filtration pores sized to remove particulates in the range from about 1 µm to about 5 µm.

* * * * *